3,272,827
α-PHENYL-β-(2-FURYL PROPIONITRILE COMPOUNDS AND A PROCESS OF MAKING SAME
Marcel Pesson, Paris, France, assignor to Societe anonyme dite: Laboratoire Roger Bellon, Neuilly-sur-Seine, Seine, France, a French company
No Drawing. Filed Oct. 7, 1964, Ser. No. 402,312
Claims priority, application Great Britain, Sept. 13, 1962, 35,021/62
15 Claims. (Cl. 260—294)

The present application is a continuation-in-part of copending application Serial No. 308,089, filed September 11, 1963, now abandoned and entitled "Chemical Compounds and Processes for Producing the Same."

The invention relates to derivatives of α-phenyl-β-2-furyl-propionitrile, compositions containing them and processes for the production of the said derivatives.

The present invention provides new, therapeutically useful derivatives of α-phenyl-β-2-furyl-propionitrile, having the formula:

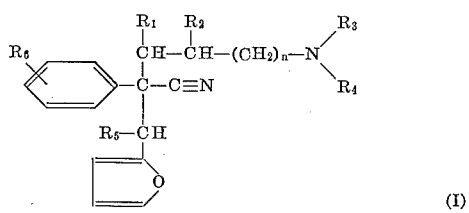

(I)

and their acid addition salts, in which $n$ is 0 or 1; $R_1$ and $R_2$ indicate the same or different substituents and are hydrogen or lower alkyl, or one of $R_1$ and $R_2$ is hydrogen or lower alkyl and the other constitutes with $R_3$ or $R_4$ an alkylene chain; $R_3$ and $R_4$ indicate the same or different substituents and are lower alkyl or together with the nitrogen atom to which they are attached form a saturated mononuclear heterocyclic ring or one of $R_3$ and $R_4$ is lower alkyl and the other is linked to $R_1$ or $R_2$ as aforesaid; $R_5$ represents hydrogen, lower alkyl, cycloalkyl, or aryl; and $R_6$ represents hydrogen or one or more substituents in the phenyl nucleus, more especially amino, alkyl, alkoxy or aryloxy radicals or groups or halogen atoms.

These new compounds have important applications in chemotherapy in view of their antitussive properties. The invention consequently includes within its scope pharmaceutical compositions containing at least one of the aforementioned compounds in association with a compatible pharmaceutical carrier. Where a compound of this invention is useful as an acid addition salt, it will be understood that the salt will contain an anion which is pharmacologically acceptable.

Especially valuable compounds of Formula I are those in which $R_1$ and $R_2$ are both hydrogen and $n$ is 0. $R_3$ and $R_4$ are preferably both methyl or both ethyl or together with the adjacent nitrogen constitute a piperidine or morpholine ring.

The preferred substituents $R_5$ are hydrogen, methyl, ethyl, or cyclohexyl. $R_6$ preferably represents hydrogen or a single substituent in the para position, e.g. halogen, especially chlorine, lower alkoxy, e.g. methoxy, or phenoxy.

According to a feature of the invention, the compounds of Formula I are prepared by reacting an alkali metal derivative (Me=alkali metal) of an α-phenyl-β-2-furyl-propionitrile, said alkali metal derivative having the formula:

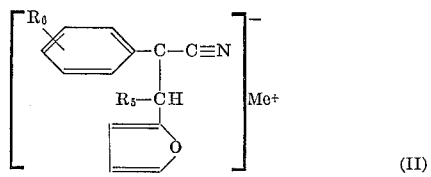

(II)

with a halogenated tertiary amine of the formula:

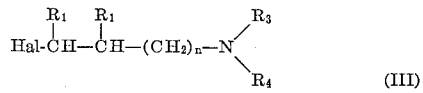

(III)

where Hal represents halogen and the other symbols are as hereinbefore defined. The alkali metal derivative is conventionally obtained by the action of an alkali metal amide on the α-phenyl-β-2-furyl-propionitrile. While any of the amides of sodium, potassium, lithium, cesium and rubidium may be employed, potassium amide gives the best results.

The action of the halogenated tertiary amine of formula III on the said alkali metal derivatives can be represented by the following equation (using the potassium derivative and a chlorinated amine):

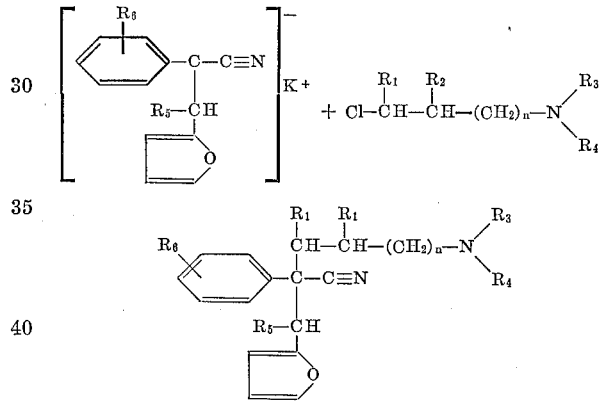

The reaction is best effected at boiling point in an inert solvent such as benzene, toluene or xylene in the presence of a slight excess of the halogenated amine.

The alkali metal derivative of the compound of Formula II is best obtained by heating, preferably at boiling point, a solution of the nitrile in an inert solvent in the presence of an alkali metal amide, preferably potassium amide.

When $R_1$ and $R_2$ represent hydrogen atoms only one reaction product is produced, from which crystalline acid addition salts, such as the hydrochloride, may be obtained. On the other hand, when the radicals $R_1$ and $R_2$ represent alkyl radicals or are part of a cyclic structure, the base obtained may be an isomer or a mixture of two isomers and does not ordinarily give a crystalline hydrochloride.

The α-phenyl-β-2-furyl-propionitrile is best prepared by catalytic hydrogenation of a furfurylidene phenyl acetonitrile, the catalyst preferably being 5% palladium precipitated on charcoal. It is already known to prepare such a compound by the interaction of furfuryl chloride and the sodium derivative of phenylacetonitrile, but, this method is unsatisfactory industrially, mainly because of the instability of furfuryl chloride.

The rate of hydrogenation, which is very slow when carried out in relatively non-polar solvents such as ethyl acetate, is faster in more polar solvents such as ethanol. Accordingly, it is preferred to carry out the reaction in a polar solvent, preferably ethanol.

Catalytic hydrogenation of the furfurylidene phenyl acetonitrile is preferably effected in the presence of a small amount of thiophene using 1.2 moles of hydrogen for each mole of nitrile. The hydrogenation of the ethylenic double bond is accompanied by secondary reactions, such as partial hydrogenation of the nitrile group, as shown by the appearance of alkaline products in the reaction medium, and of the furane ring. The hydrogenation of the latter is effectively inhibited by the addition of thiophene. If the reaction is allowed to continue after 1.2 moles of hydrogen have been absorbed, the products obtained are not very stable on storing and quickly become discolored. When proceeding as described above, α-phenyl-β-2-furyl-propionitrile is obtained after purification in a good yield, is colorless and can be stored satisfactorily at ordinary temperature without becoming discolored.

The preparation of α-phenyl-β-2-furyl-propionitrile is given below by way of illustration.

16 g. of 5% palladium precipitated on charcoal are suspended in 80 cc. of ethanol and 12 cc. of a 1% solution of freshly distilled thiophene in anhydrous ethanol are added. The catalyst is then saturated with hydrogen in a hydrogenation apparatus under ordinary pressure and a solution of 78 g. of furfurylidene phenyl acetonitrile in 320 cc. of ethanol is added. Hydrogenation is discontinued when the volume of hydrogen absorbed is 11.46 liters (760 mm. Hg; temperature: 20° C.). The reaction duration is 7½ hours. The solution is then filtered, the alcohol distilled off on a water bath in vacuo, the residue taken up in 200 cc. of benzene, washed with 4 N hydrochloric acid and then with water, and finally dried over magnesium sulfate. The solvent is distilled off and the residue is subjected to fractional distillation in vacuo. 72 g. of α-phenyl-β-2-furyl-propionitrile which boils at 144° C./4 mm. (Yield=90%) are obtained. On saponification with potassium ethoxide, this nitrile yields α-phenyl-β-2-furyl-propionic acid; melting point 101°/C.

The following examples illustrate the present invention without, however, limiting the same thereto.

EXAMPLE I

*α-2-dimethylamino ethyl-α-phenyl-β-2-furyl-propionitrile*

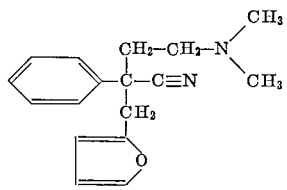

A suspension of potassium amide is prepared from 200 cc. of liquid ammonia, 3.9 g. of potassium metal and 0.15 g. of ferric nitrate and a solution of 19.7 g. of α-phenyl-β-2-furyl-propionitrile is added thereto while stirring. The mixture is heated under reflux with stirring until the excess ammonia is completely removed. After cooling, a solution of 10.7 g. of 2-dimethylamino-chloroethane in 30 cc. of anhydrous toluene is added with stirring and the mixture is heated for 5 hours under reflux. 10 cc. of alcohol are then added to destroy unreacted amide. After cooling, the mass is poured on to 200 g. of crushed ice. When the ice has melted, the organic phase is separated by decantation and the aqueous phase is extracted three times with ether, using 75 cc. on each occasion. The ethereal extracts are combined with the organic phase and the mixture is extracted three times with 100 cc. of 2.5 N hydrochloric acid. The recombined acid solutions are made alkaline with 40% sodium hydroxide solution; the resulting oil is extracted with ether, the organic solution is washed with water and then dried over magnesium sulfate. The solvent is driven off by distillation under normal pressure and the residue is subjected to fractional distillation in a good vacuum.

After distilling off a small first fraction consisting essentially of excess 2-dimethylamino-1-chloroethane, the main fraction distills at 150–154° C./0.8 mm. 14.5 g. of the desired compound are obtained.

The molecular weight found (determined by titration with perchloric acid in acetic acid) is 271; calculated for $C_{17}H_{20}N_2O$ it is 268.35.

This base, treated with alcoholic hydrochloric acid, gives a hydrochloride which can be recrystallized from ethanol; melting point: 218–220° C.

*Analysis.*—$C_{17}H_{20}N_2O \cdot HCl$: Molecular weight=304.85. Calculated: C%=66.92; H%=6.88; N%=9.18%; Cl%=11.64. Found: C%=67.32; H%=7.07; N%=9.30; Cl%=11.51.

EXAMPLE II

*α-2-diethylamino ethyl-α-phenyl-β-2-furyl-propionitrile*

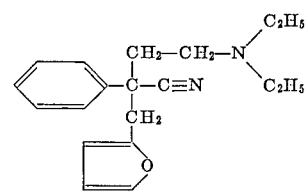

This base is prepared by proceeding as described in Example I, by reacting 2-diethylamino-1-chloroethane on α-phenyl-β-2-furyl-propionitrile treated with potassium amide. It boils at 150–154° C./0.09 mm.

*Analysis.*—$C_{19}H_{24}N_2O$: Molecular weight=296.40. Calculated: C%=76.99; H%=8.16; N%=9.45. Found: C%=77.09; H%=8.30; N%=9.15.

The hydrochloride, recrystallized from acetone, melts at 185–186° C.

*Analysis.*—$C_{19}H_{24}N_4O \cdot HCl$. Calculated: C%=68.48; H%=7.50; N%=8.41; Cl%=10.71. Found: C%=68.64; H%=7.64; N%=8.20; Cl%=10.71.

EXAMPLE III

*α-2-piperidino ethyl-α-phenyl-β-2-furyl-propionitrile*

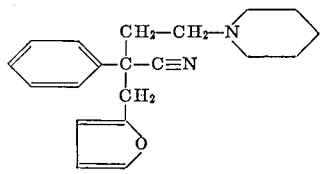

This compound is prepared by proceeding as described in Example I, starting from α-phenyl-β-2-furyl-propionitrile and 2-piperidino-1-chloroethane. It boils at 206–208°/0.3 mm. The hydrochloride, recrystallized from ethanol, melts at 191–192° C.

*Analysis.*—$C_{20}H_{24}N_2C \cdot HCl$: Moleular weight=343.91. Calculated: C%=69.66; H%=7.25; N%=8.12; Cl%=10.30. Found: C%=69.75; H%=7.28; N%=7.98; Cl%=10.43.

EXAMPLE IV

*α-2-morpholino ethyl-α-phenyl-β-2-furyl-propionitrile*

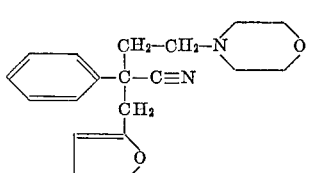

This compound is prepared by proceeding as described in Example I, starting from α-phenyl-β-2-furyl propionitrile and 2-morpholino-1-chloroethane. It is a very viscous liquid which boils at 182–192° C./0.2 mm.

*Analysis.*—$C_{19}H_{22}N_2O_2$: Molecular weight=310.38. Calculated: C%=73.52; H%=7.14; N%=9.03. Found: C%=73.54; H%=7.05; N%=9.00.

The hydrochloride melts at 197° C.

EXAMPLE V

*α-3-dimethylamino propyl-α-phenyl-β-2-furyl-propionitrile*

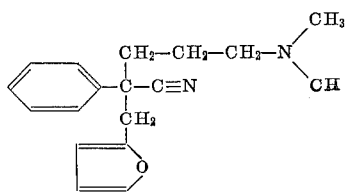

This base is prepared by proceeding as described in Example I by reacting 3-dimethylamino-1-chloropropane with a-phenyl-β-2-furyl-propionitrile treated with potassium amide. It boils at 160–162° C./0.9 mm. The molecular weight (determined by titration with perchloric acid in acetic acid) is 282; calculated for $C_{18}H_{22}N_2O$ it is 282.37. The hydrochloride recrystallized from alcohol melts at 183–184° C.

*Analysis.*—$C_{18}H_{22}N_2O \cdot HCl$: Molecular weight=318.80. Calculated: C%=67.75; H%=7.21; N%=8.78; Cl%=11.13. Found: C%=67.82; H%=7.47; N%=8.81; Cl%=11.10.

EXAMPLE VI 19.7 g. of α-phenyl-β-2-furyl-propionitrile dissolved in 120 cc. of anhydrous toluene are treated, as in Example I, with potassium amide prepared from 3.9 g. of potassium metal. After removing excess ammonia, a solution of 15 g. of 1-ethyl-3-chloropiperidine in 50 cc. of toluene is added: The mixture is heated for 6 hours under reflux and the reaction products are isolated as described in Example I. An oil is obtained which boils at 180–186° C./0.6 mm.

*Analysis.*—$C_{20}H_{24}N_2O$: Molecular weight=308.41. Calculated: C%=77.88; H%=7.84; N%=9.08. Found: C%=77.64; H%=8.08; N%=8.88.

The product thus obtained may be one of the isomers (A) or (B) or a mixture thereof.

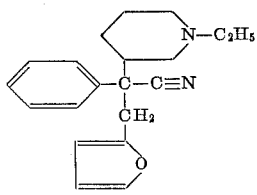

(A)

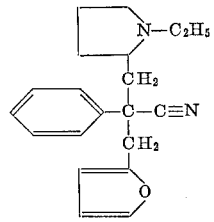

(B)

EXAMPLE VII

*α-2-(2-methyl-1-piperidyl)ethyl-α-phenyl-β-2-furyl-propionitrile*

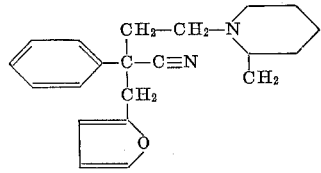

Under the conditions of Example I α-phenyl-β-2-furyl-propionitrile (19.7 g.) is treated with the potassium metal amide prepared from 3.9 g. of potassium and then alkylated with 1-chloro-2-2'-methylpiperidyl-ethane, to give α-2-(2-methyl-1-piperidyl)-ethyl-α-phenyl-β-2-furyl-propionitrile, which boils at 166–168° C./0.08 mm.

*Analysis.*—$C_{21}H_{26}N_2O$: Molecular weight=322.43. Calculated: C%=78.22; H%=8.13; N%=8.69. Found: C%=77.95; H%=8.25; N%=8.40.

EXAMPLE VIII 19.7 g. of α-phenyl-β-2-furyl-propionitrile dissolved in 120 cc. of toluene are treated as described in Example I with potassium amide prepared from 3.9 g. of potassium metal. 12.1 g. of 1-dimethylamino-2-chloropropane dissolved in 50 cc. of anhydrous toluene are added and the mixture is heated for 6 hours under reflux. The reaction product is isolated as described in Example I. 17.3 g. of an oil are obtained which boils at 154–164° C./0.08 mm.

*Analysis.*—$C_{18}H_{22}N_2O$: Molecular weight=282.37. Calculated: C%=76.56; H%=7.85; N%=9.92. Found: C%=76.61; H%=7.85; N%=9.64.

This compound consists of one of the isomers (C) and (D) or of a mixture thereof:

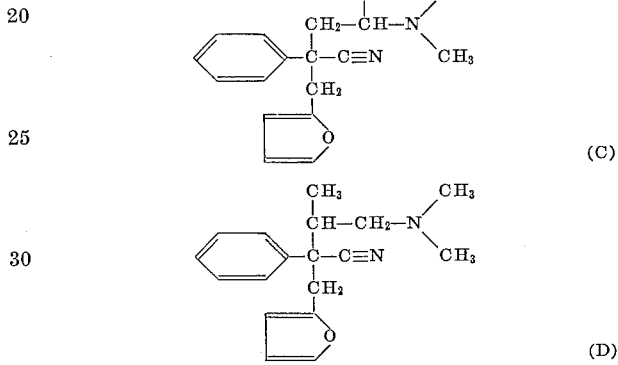

EXAMPLE IX

*α-2-pyrrolidino-ethyl-α-phenyl-β-2-furyl-propionitrile*

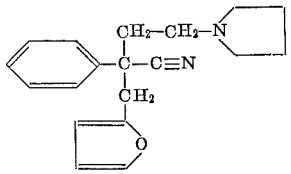

This base is prepared as described in Example I, by reacting 2-pyrrolidino-chloro ethane with an α-phenyl-β-2-furyl-propionitrile treated with potassium amide. It boils at 170° C./0.3 mm.

*Analysis.*—$C_{19}H_{22}N_2O$: Molecular weight=294.38. Calculated: C%=77.52; H%=7.53; N%=9.52. Found: C%=77.26; H%=7.89; N%=9.42.

The hydrochloride melts at 184° C.

EXAMPLE X

*α-2-dimethylamino-ethyl-α-p-chlorophenyl-β-2-furyl-propionitrile*

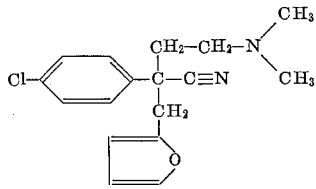

This base is prepared as described in Example I, by the action of 2-dimethylamino-chloro ethane on α-p-chlorophenyl-β-2-furyl-propionitrile treated with potassium amide. It boils at 168–172° C./0.3 mm.

*Analysis.*—$C_{17}H_{19}ClN_2O$: Molecular weight=302.5. Calculated: C%=67.43; H%=6.28; N%=9.25; Cl%=11.73. Found: C%=67.80; H%=6.48; N%=8.95; Cl%=11.56.

The hydrochloride melts at 180° C.

The α-p-chlorophenyl-β-2-furyl-propionitrile required for the preparation of this base is obtained by the action of furfuryl chloride on p-chlorophenylacetonitrile treated with sodamide. It boils at 150 to 160° C./0.7 mm. and, on recrystallization from cyclohexane, melts at 63° C.

*Analysis.*—C$_{13}$H$_{10}$ClNO: Molecular weight=231.5. Calculated: C%=67.38; H%=4.31; N%=6.04; Cl%=15.33. Found: C%=67.48; H%=4.39; N%=5.81; Cl%=15.27.

EXAMPLE XI

*α-2-dimethylamino-ethyl-α-phenyl-β-ethyl-β-2-furyl-propionitrile*

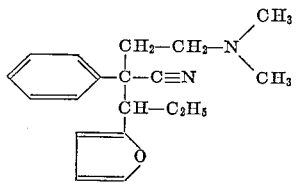

This compound is prepared as described in Example I starting from 2-dimethylamino-chlorethane and the potassium derivative of α-phenyl-β-ethyl-β-2-furyl-propionitrile. It is an oil which boils at 148° C./0.5 mm.

*Analysis.*—C$_{19}$H$_{24}$N$_2$O: Molecular weight=296.4. Calculated: C%=76.99; H%=8.16; N%=9.45. Found: C%=76.70; H%=7.92; N%=9.34.

The maleate melts at 114° C.

EXAMPLE XII

*α-2-piperidino-ethyl-α-phenyl-β-ethyl-β-2-furyl-propionitrile*

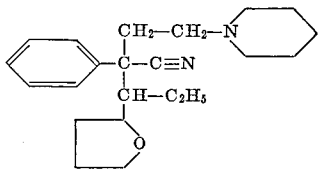

This base is prepared as described in Example I by reacting 2-piperidino-chloro ethane on α-phenyl-β-ethyl-β-2-furyl-propionitrile treated with potassium amide. It is a viscous oil boiling at 168° C./0.1 mm.

*Analysis.*—C$_{22}$H$_{28}$N$_2$O: Molecular weight=336.46. Calculated: C%=78.53; H%=8.39; N%=8.33. Found: C%=78.58; H%=8.37; N%=8.10.

EXAMPLE XIII

*α-2-dimethylamino-ethyl-α-phenyl-β-2-furyl-β-methyl propionitrile*

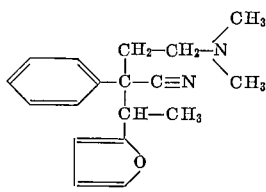

This base is prepared as described in Example I by reacting 2-dimethylamino-chloro ethane with α-phenyl-β-2-furyl-β-methyl propionitrile treated with potassium amide. It is an oil which boils at 132° C./0.2 mm.

*Analysis.*—C$_{18}$H$_{22}$N$_2$O: Molecular weight=282.37. Calculated: C%=76.56; H%=7.85; N%=9.82. Found: C%=76.80; H%=7.83; N%=9.82.

EXAMPLE XIV

*α-2-piperidino-ethyl-α-phenyl-β-2-furyl-β-methyl propionitrile*

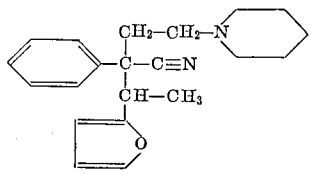

This base is prepared as described in Example I by reacting 2-piperidino-chloro ethane with α-phenyl-β-2-furyl-β-methyl-propionitrile treated with potassium amide. It is an oil which boils at 168° C./0.1 mm.

*Analysis.*—C$_{21}$H$_{26}$N$_2$O: Molecular weight=322.43. Calculated: C%=78.22; H%=8.13; N%=8.69. Found: C%=78.82; H%=8.18; N%=8.78.

A hydrochloride, melting at 246° C. (with decomposition), has been prepared from this product, which probably consists of a mixture of stereo-isomers (due to the asymmetric α- and β-carbon atoms of the propionitrile chain).

EXAMPLE XV

*α-2-dimethylamino-ethyl-α-phenyl-β-2-furyl-β-cyclohexyl-propionitrile*

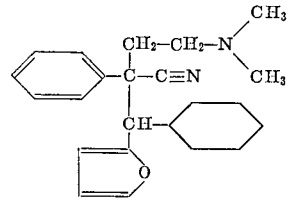

This base is prepared as described in Example I by reacting 2-dimethylamino-chloro ethane with α-phenyl-β-2-furyl-β-cyclohexyl-propionitrile. The reaction product is separated from the toluene phase by adding hydrochloric acid thereto, thereby producing the corresponding insoluble hydrochloride, which is isolated by filtration. The filtered hydrochloride is suspended in water and the suspension is rendered strongly alkaline by the addition of sodium hydroxide solution with agitation. The resulting oil is extracted with ether, the ethereal solution is washed and dried over anhydrous magnesium sulfate. The solvent is then removed and the residue is recrystallized from cyclohexane; melting point 151° C.

*Analysis.*—C$_{23}$H$_{30}$N$_2$O: Molecular weight=350.49. Calculated: C%=78.81; H%=8.63; N%=7.99. Found: C%=79.03; H%=8.71; N%=7.80.

The molecular weight (determined by titration with perchloric acid in acetic acid) is 352.5. The α-phenyl-β-2-furyl-β-cyclohexyl-propionitrile required in the preparation of the above mentioned compound is by reacting cyclohexyl magnesium bromide with a α-phenyl-β-2-furyl-acrylonitrile. The crude reaction product is an oil, boiling at 168° C./0.1 mm.; it which partly crystallizes on cooling. It has been possible to obtain therefrom two stereo-isomers melting at 122° C. and 90° C. by fractional recrystallization from ether. Alkylation of these two stereoisomers by means of 2-dimethylamino-chloro ethane gives as the main reaction product the same α-2-dimethylamino - ethyl - α - phenyl - β - 2 - furyl - β-cyclohexyl-propionitrile melting at 151° C.

EXAMPLE XVI

*α-2-piperidino-ethyl-α-phenyl-β-2-furyl-β-cyclohexyl-propionitrile*

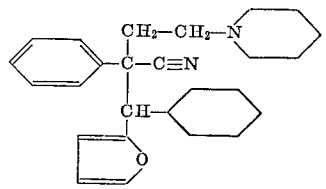

This base is prepared as described in Example XV by reacting 2-piperidino-chloro ethane with α-phenyl-β-2-furyl-β-cyclohexyl-propionitrile treated with potassium amide. It gives an insoluble hydrochloride of the melting point 134° C., when treated as described in Example XV.

*Analysis.*—C$_{26}$M$_{34}$N$_2$O: Molecular weight=390.55. Calculated: C%=79.95; H%=8.78; N=7.17. Found: C%=80.50; H%=8.90; N%=7.21.

EXAMPLE XVII

α-2-dimethylamino-ethyl-α-p-methoxyphenol-β-2-furyl-propionitrile

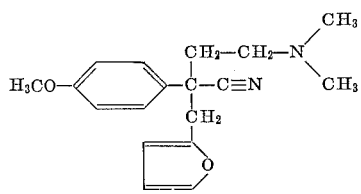

This base is prepared as described in Example I, by reacting 2-dimethylamino-chloro ethane with α-p-methoxy-phenyl-β-2-furyl-propionitrile treated with potassium amide. It is an oil which boils at 151–152° C./0.08 mm.

*Analysis.*—$C_{18}H_{22}N_2O_2$: Molecular weight=298. Calculated: C%=72.45; H%=7.43; N%=9.39. Found: C%=73.9; H%=6.11; N%=5.79.

The hydrochloride, recrystallized from acetone, melts at 175–178° C. (with decomposition).

α - p-Methoxy phenyl-β-2-furyl-propionitrile, used as starting material, is obtained by the action of furfuryl chloride on p-methoxyphenylacetonitrile. It is an oil which boils at 138–140° C./0.04 mm.

*Analysis.*—$C_{14}H_{13}NO_2$: Molecular weight=227.25. Calculated: C%=73.99; H%=5.77; N%=6.16. Found: C%=73.9; H%=6.11; N%=5.79.

EXAMPLE XVIII

α-2-dimethylamino-ethyl-α-p-phenoxyphenyl-β-2-furyl-propionitrile

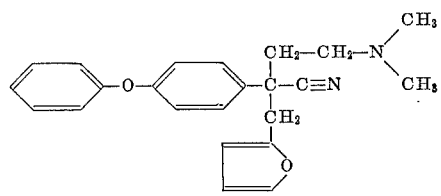

This base is prepared by reacting 2-dimethylamino-chloro ethane with α-p-phenoxyphenyl-β-2-furyl-propionitrile treated with potassium amide. It is a very viscous oil which distills at 196–212° C./0.8 mm. It gives a hydrochloride, which can be recrystallized from a mixture of ethyl acetate and acetone (1:2 by volume) and then melts at 169–170° (with decomposition). This hydrochloride has the following analytical composition.

*Analysis.*—$C_{23}H_{24}N_2O_2 \cdot HCl$: Molecular weight=396.5. Calculated: C%=69.60; H%=6.30; N%=7.06; Cl%=8.95. Found: C%=69.47; H%=6.35; N%=6.99; Cl%=8.84.

α-p-Phenoxyphenyl-β-2-furyl-propionitrile is obtained by the action of furfuryl chloride on p-phenoxyphenylacetonitrile treated with sodium amide in toluene. It is a very viscous oil which boils at 190–198° C./0.04 mm.

*Analysis.*—$C_{19}H_{15}NO_2$: Molecular weight=289. Calculated: C%=78.87; H%=5.23; N%=4.84. Found: C%=79.20; H%=5.46; N%=4.45.

The therapeutic value of the compounds of the present invention has been established by extensive pharmacodynamic investigations.

The compounds were tested in the form of their salts described in the foregoing examples. Where crystalline salts were not obtained, solutions of the hydrochlorides containing 250 mg. of salt per cc. were used.

The toxicity of the compounds was studied and the $LD_{50}$ in the mouse was determined by intravenous injection. The following $LD_{50}$ values of the compounds of Examples I to VII and IX to XVIII were obtained, these values being given in mg./kg.

| Compound of Example No. | Toxicity $LD_{50}$, mg./kg. |
| --- | --- |
| I | 55 |
| II | 45 |
| III | 40 |
| IV | 75 |
| V | 45 |
| VI | 50 |
| VII | 95 |
| IX | 38 |
| X | 50 |
| XI | 35 |
| XII | 35 |
| XIII | 37 |
| XIV | 30 |
| XV | 25 |
| XVI | 25 |
| XVII | 62 |
| XVIII | 50 |

The antitussive activity of the compounds was investigated by using the following three test methods (a), (b) and (c).

(a) The electrical stimulation test of the superior laryngeal nerve of a cat (Domenjoz technique).

A cat is anesthetized by intraperitoneal injection of 25 mg./kg. of Nembutal and its superior laryngeal nerves are carefully dissected. Electrical excitations are then given with a stimulator at the rate of 5 to 10 per second for 5 to 10 seconds, the excitations (0.5 to 1 volt) being repeated during periods of at least 10 minutes. The movements of the abdominal region corresponding to breathing and attacks of coughing are recorded with a Marey device. The value of an administered antitussive substance is evaluated by observing the disappearance of these phenomena.

The table below indicates the doses corresponding to complete elimination of the fits of coughing.

| Compound of Example No. | Doses in mg./kg. eliminating the fits of coughing |
| --- | --- |
| I | 2.5–5 |
| II | >5 |
| III | 5 |
| IV | >10 |
| V | 5 |
| VI | 5–10 |
| VII | 10–20 |
| IX | >5 |
| X | ≥2.5 |
| XI | >5 |
| XII | >5 |
| XIII | >5 |
| XIV | 5 |
| XV | 2.5 |
| XVI | >2.5 |
| XVII | 5–10 |
| XVIII | >5 |

(b) Test using sulfuric acid aerosols on the guinea pig (technique of Eichler and Smiatek).

The coughing attacks caused by inhalation of irritant sulfuric acid vapor were compared before and after injecting the compound to be investigated. For this purpose, there were employed groups of 5 to 10 guinea pigs of a weight between 300 g. and 350 g.; these animals; were subjected twice, within an interval of 1 hour, to the action of half-normal and normal sulfuric acid.

After administering predetermined doses of the active compound, the complete suppression of the sensitivity to the aerosols was observed. The following table indicates the doses necessary to obtain such suppression.

| Compound of Example No. | Doses in mg./kg. suppressing the fits of coughing |
|---|---|
| I | 15 |
| III | 10 |
| V | ≥10 |
| VI | ≥15 |
| VII | ≥25 |
| X | >10 |
| XII | >10 |
| XV | >10 |

(c) The test involving mechanical excitation of the trachea of a guinea pig.

The guinea pigs were anesthetized by intraperitoneal injection of 25 mg./kg. of Nembutal. A tracheotomy was then carried out and the tracheal epithelium was excited mechanically with a hair. The dose which prevents the occurrence of fits of coughing was determined for the various compounds under test.

The following table gives the doses found for the different compounds tested.

| Compound of Example No. | Doses in mg./kg. suppressing the occurrence of fits of coughing |
|---|---|
| I | 5 |
| III | 5 |
| V | 5 |
| VI | 10 |
| VII | >20 |
| X | >5 |
| XII | ≥5 |
| XV | 2.5 |
| XVII | >5 |
| XVIII | 5 |

The spasmolytic activity of the compounds of the invention was determined as follows.

On isolated organs, such as a rat duodenum placed in an oxygenated Tyrode solution at 37° C., a spasm was caused by administering either acetyl-choline at a concentration of about $10^{-7}$, or barium chloride at a concentration of $10^{-4}$. After washing, it was attempted to prevent the occurrence of fresh spasms by adding the substance investigated.

The following table gives the concentrations of the compounds of the invention which are necessary to reduce by one half the spasms caused by the one or the other of the spasmogenic compounds.

| Compound of Example No. | Concentration of compounds | |
|---|---|---|
| | With Acetyl-choline | With Barium chloride |
| I | 6×10⁻⁶ | 10⁻⁵ |
| III | 2×10⁻⁶ | 6×10⁻⁶ |
| V | 3×10⁻⁶ | 6×10⁻⁶ |
| VI | 3×10⁻⁶ | 3×10⁻⁶ |
| VII | 6×10⁻⁶ | 10⁻⁵ |
| IX | 2×10⁻⁶ | 6×10⁻⁶ |
| X | 1×10⁻⁶ | 3×10⁻⁶ |
| XI | 3×10⁻⁶ | 6×10⁻⁶ |
| XII | 6×10⁻⁷ | 6×10⁻⁷ |
| XIII | 3×10⁻⁶ | 3×10⁻⁶ |
| XIV | 2×10⁻⁶ | 3×10⁻⁶ |
| XV | 2×10⁻⁶ | 1×10⁻⁶ |
| XVI | 1×5×10⁻⁵ | 6×10⁻⁶ |
| XVII | 5×10⁻⁶ | |

The depressant effect of the compounds of the invention on the central nervous system was determined by measuring potentiation of narcosis due to hexobarbital. 75 mg./kg. of hexobarbital were injected intraperitoneally into groups of 20 mice. One group was kept for comparison purposes, and the mice of the other groups were injected intraperitoneally 30 minutes before barbiturate administration with the compound to be investigated.

The following table indicates the doses which double the narcosis duration.

| Compound of Example No. | Doses in mg./kg. which double the narcosis time |
|---|---|
| I | 10 |
| III | 5 |
| VII | 25 |
| XII | 10 |
| XIV | 10 |
| XV | 10 |
| XVII | 10 |

The respiration of unanaesthetized rabbits was then examined as follows. The respiration was recorded with the aid of a nasal probe connected to a Marey capsule and then the rhythm and amplitude before and after intraperitoneal administration of the compound tested were examined. It was found that the compounds of Examples I and III are slightly analeptic at doses of 5 mg./kg. and that the compound of Example VII is a depressant at a dose of 20 mg./kg.

The local anesthetic activity of the compounds of the invention was studied by the following test. The active substance was instilled into the eye of the rabbit and the dose was determined which caused the disappearance of the oculo-palpebral reflex caused by touching the cornea.

After administration of the drug, the reflex occurs only after a certain number of stimulations or it disappears altogether. In this test, the compounds of Examples III, V, VI, VII, IX, X, XII and XVIII possess interesting properties and, at relatively small concentrations, cause the oculo-palpebral reflex to disappear completely.

By these different tests, it has been shown that the derivatives of α-phenyl-β-2-furyl-propionitrile of this invention are of therapeutic interest. Their antitussive action has been shown in three different tests and their toxicity is low enough for their therapeutic use. In addition, they show spasmolytic effects and reinforce the narcosis caused by barbiturates. The compounds of Examples I, III, XIV, and XV are the most interesting compounds. The simultaneous occurrence of antitussive and spasmolytic properties is of particular interest when comparing the compounds, for instance, with codein which has antitussive properties but which, unlike the compounds of the invention, has an undesired secondary constipating action.

I claim:
1. The α-phenyl-β-2-furyl propionitrile compound selected from the group consisting of an α-phenyl-β-2-furyl propionitrile of the formula

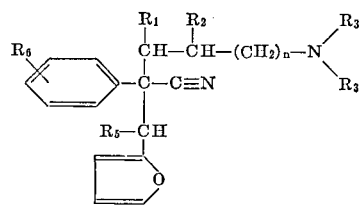

wherein:
R₁ and R₂ are members selected from the group consisting of hydrogen and lower alkyl;
R₃ and R₄ are members selected from the group consisting of lower alkyl and R₃ and R₄, together with the nitrogen atom to which they are attached, forming a saturated mononuclear heterocyclic ring;
R₅ is a member selected from the group consisting of hydrogen, lower alkyl, and cyclohexyl;
R₆ is a member selected from the group consisting of hydrogen, chlorine, lower alkoxy, and phenoxy; and
n indicates one of the integers 0 and 1,
and its pharmaceutically acceptable acid addition salts.

2. The α-phenyl-β-2-furyl propionitrile compound selected from the group consisting of an α-phenyl-β-2-furyl propionitrile of the formula

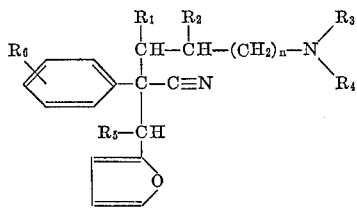

wherein:
one of $R_1$ and $R_2$ is a member selected from the group consisting of hydrogen and lower alkyl and one of $R_3$ and $R_4$ is lower alkyl, while the other one of $R_1$ and $R_2$ together with the other one of $R_3$ and $R_4$ forms a lower alkylene chain;
$R_5$ is a member selected from the group consisting of hydrogen, lower alkyl, and cyclohexyl;
$R_6$ is a member selected from the group consisting of hydrogen, chlorine, lower alkoxy, and phenoxy; and
$n$ indicates one of the integers 0 and 1,
and its pharmaceutically acceptable acid addition salts.

3. The α-di-lower alkylamino lower alkyl α-phenyl-β-2-furyl propionitrile.

4. The pharmaceutically acceptable acid addition salts of α-di-lower alkylamino lower alkyl-α-phenyl-β-2-furyl propionitrile.

5. α-2-dimethylamino ethyl-α-phenyl-β-2-furyl propionitrile.

6. The hydrochloride of α-2-dimethylamino ethyl-β-2-furyl propionitrile.

7. α-2-piperidino ethyl-α-phenyl-β-2-furyl propionitrile.

8. The hydrochloride of α-2-piperidino-α-phenyl-β-2-furyl propionitrile.

9. α-3-dimethylamino propyl-α-phenyl-β-2-furyl propionitrile.

10. The hydrochloride of α-3-dimethylamino propyl-α-phenyl-β-2-furyl propionitrile.

11. α-2-piperidino ethyl-α-phenyl-β-2-furyl-β-methyl-propionitrile.

12. α-2-dimethylamino ethyl-α-phenyl-β-2-furyl-β-cyclohexyl propionitrile.

13. The α-piperidino lower alkyl-α-phenyl-β-2-furyl-β-lower alkyl propionitrile.

14. The pharmaceutically acceptable acid addition salts of α-piperidino lower alkyl-α-phenyl-β-2-furyl-β-lower alkyl propionitrile.

15. The α-phenyl-β-2-furyl propionitrile compound selected from the group consisting of an α-phenyl-β-2-furyl propionitrile of the formula

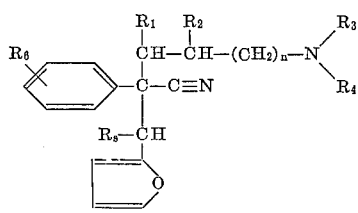

wherein:
$R_1$ and $R_2$ are members selected from the group consisting of hydrogen and lower alkyl;
$R_3$ and $R_4$ are members selected from the group consisting of lower alkyl and $R_3$ and $R_4$ together with the nitrogen atom to which they are attached, form a saturated mononuclear heterocyclic ring, and one of $R_3$ and $R_4$ together with one of $R_1$ and $R_2$ forming a lower alkylene chain;
$R_5$ is a member selected from the group consisting of hydrogen, lower alkyl, and cyclohexyl;
$R_6$ is a member selected from the group consisting of hydrogen, chlorine, lower alkoxy, and phenoxy; and
$n$ indicates one of the integers 0 and 1,
and its pharmaceutically acceptable acid addition salts.

References Cited by the Examiner

FOREIGN PATENTS 620,631    1/1963    Belgium.
776,705    6/1957    Great Britain.

WALTER A. MODANCE, *Primary Examiner.*

AVROM D. SPEVACK, *Assistant Examiner.*